UNITED STATES PATENT OFFICE.

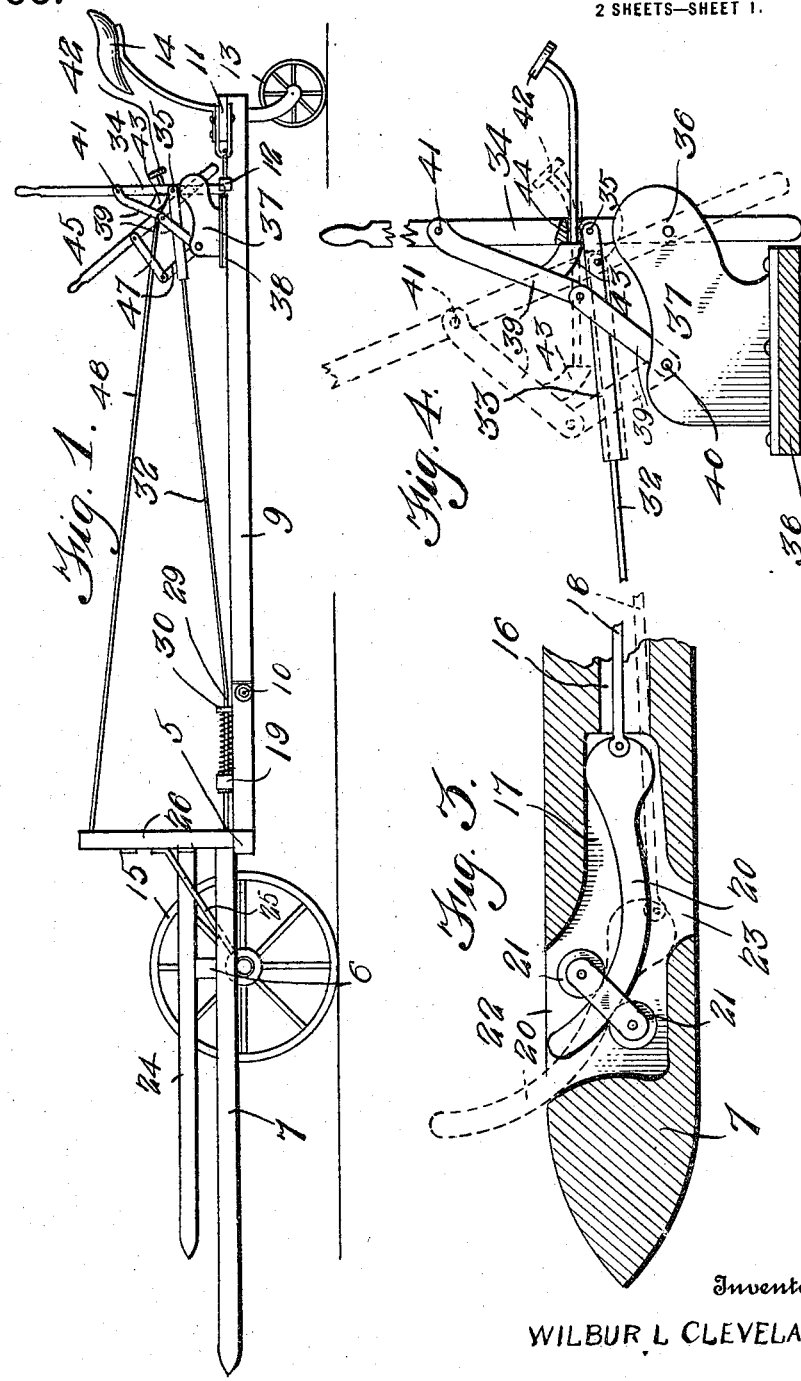

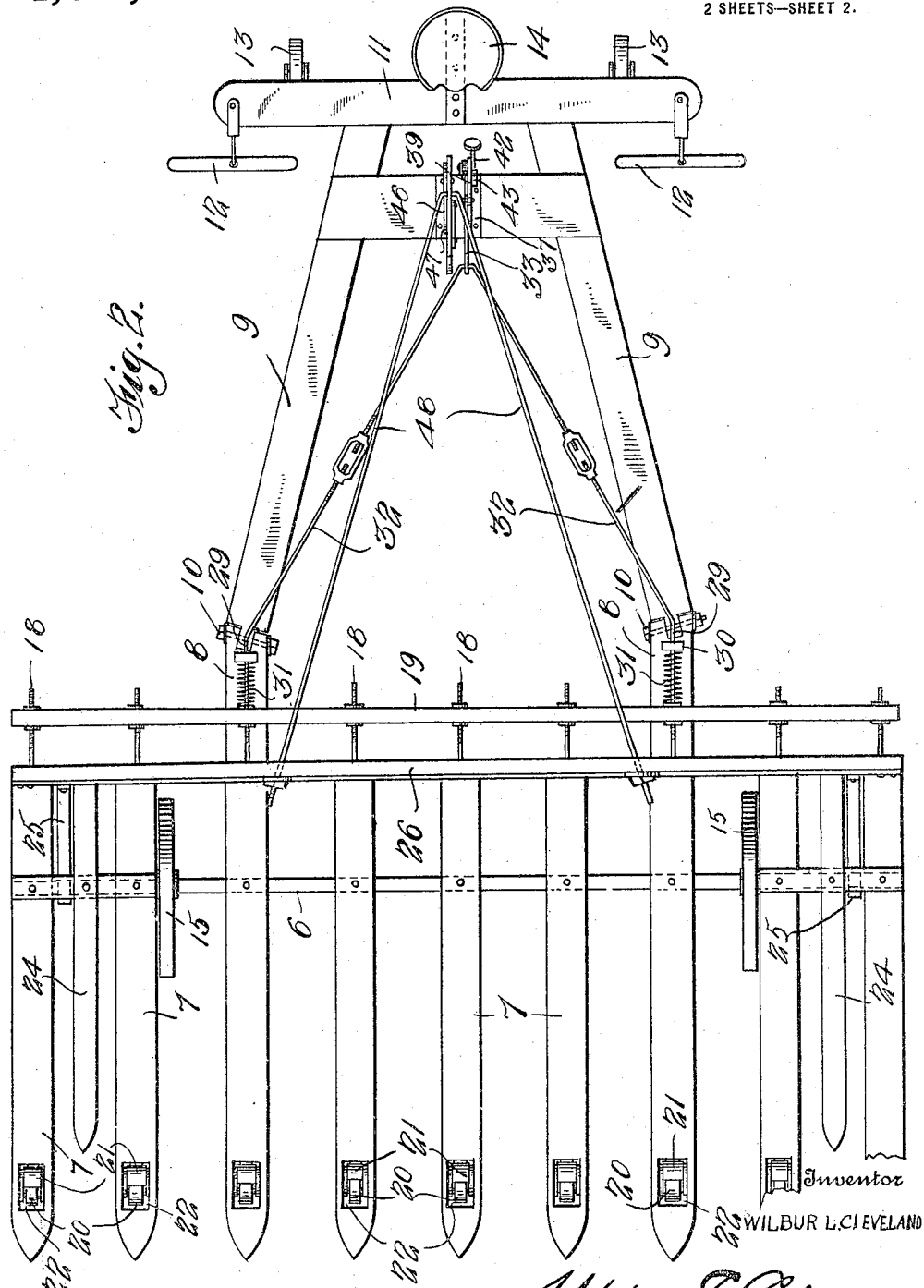

WILBUR L. CLEVELAND, OF LAMAR, COLORADO.

HAY RAKE OR STACKER.

1,230,066.  Specification of Letters Patent.  Patented June 12, 1917.

Application filed January 17, 1917. Serial No. 142,900.

*To all whom it may concern:*

Be it known that I, WILBUR L. CLEVELAND, a citizen of the United States, residing at Lamar, in the county of Prowers and State of Colorado, have invented certain new and useful Improvements in Hay Rakes or Stackers, of which the following is a specification, reference being had to the accompanying drawings.

This invention relates to certain new and useful improvements in hay rakes or stackers, and has for its primary object to provide simple and efficient means for retaining the hay upon the rake tooth bars.

It is a more particular object of the invention, to provide a curved, extensible rod bodily shiftable in each of the tooth bars, and manually operable means for simultaneously projecting said rods above the upper surfaces of the bars.

It is also another object of my invention to provide additional, relatively short, tooth bars at opposite sides of the rake, and means for vertically tilting the rake so as to raise or lower the points of the tooth bars.

It is a further general object of the invention to improve and simplify the construction of devices of the above character whereby the same are rendered highly durable and serviceable in practical use, as well as capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a side elevation, illustrating the preferred embodiment of the invention;

Fig. 2 is a top plan view;

Fig. 3 is an enlarged sectional view through one of the tooth bars, showing the retaining rod in its projected position; and Fig. 4 is a detail elevation of the operating means for the retaining rods.

Referring in detail to the drawing, 5 and 6 designate spaced, parallel frame bars to which the series of spaced, longitudinally extending, rake bars 7 are suitably secured. Relatively short, rearwardly extending bars 8 are also properly spaced from each other and fixed to the frame bar 5, and to the rear ends of these bars the beams 9 are connected at one of their ends by pivot bolts 10. The rear ends of these beams are connected to each other by a transverse draft bar 11, to the opposite ends of which the whiffletrees 12 are attached. This draft bar is supported by spaced caster wheels indicated at 13, and upon the same a spring seat 14 is centrally mounted.

The rake bars 7 are supported by means of spaced wheels 15 journaled in suitable bearings depending from the frame bar 6. Each of the longitudinal bars 7 is centrally bored, as at 16, said bore at its forward end opening into a longitudinal, elongated chamber 17. A rod 18 is shiftable in the bore 16 of each bar 7, and the rear ends of these rods are connected together by a transversely disposed beam 19. A curved rod 20 is loosely connected at one of its ends to the forward end of each of the rods 18, and the rod 20 is movable between spaced rollers 21 mounted in a suitable bearing fixed within the chamber 17. This curved rod is adapted to be projected forwardly and upwardly through an opening 22 in the top of the bar 7, adjacent its point, and an opening 23 is also provided adjacent the rear end of the chamber 17 at the bottom wall thereof, through which dirt or other foreign matter collecting within the chamber may find an outlet.

Upon the rear ends of the bars 7, a vertically disposed frame 26 is secured to limit the rearward movement of the hay, and to opposite ends of this frame the relatively short, forwardly extending, tooth bars 24 are fixed. Braces 25 are pivoted at one of their ends to the opposite ends of the frame bar 6 and have their other ends connected to the frame 26.

Rods 29 are connected at their forward ends to the beam 19 above each of the bars 8, the rear ends of these rods being movable through bearing members 30 fixed upon said bars. A coil spring 31 surrounds each of the rods 29 and is interposed between the bearing lug 30 and the beam 19. To the rear ends of the rods 29, the rearwardly converging rods 32 are loosely connected, said rods at their rear ends being pivotally connected to the forward end of a bar 33, the rear end of which is bifurcated to receive a lever 34, said bar and lever being connected by a pivot bolt 35. This lever 34 is fulcrumed, as at 36, at a point below the pivot bolt 35 upon a suitable standard or support 37 mounted upon a platform 38 connecting the beams 9 adjacent their rear ends. A pair of links 39 are pivotally connected to each other at one of their ends, the other end of one link being pivoted to the standard 37 as shown at 40, and the other end of the other of said links being pivotally connected to the lever 34 above the pivot bolt 35, as indicated at 41. The latter link, adjacent the point of connection to the other of the links, has a rearwardly extending, curved rod 42 suitably fixed thereto, said rod having an enlargement 43 thereon adjacent to the link, which is adapted to abut against the edge of the lever 34 and serve to limit the movement of the link 39 toward the lever. The rod 42 is movable freely through an opening 44 in the lever.

A second lever 45 is also mounted upon a standard or support 46, and a pair of links 47 likewise connect this lever to said standard precisely in the same manner as above referred to in connection with the lever 34. The rear ends of the convergently disposed rods 48 are pivotally connected to the latter lever 45 above its fulcrum, the forward ends of said rods 48 being connected to the upper end of the vertical frame 28.

From the above description, taken in connection with the accompanying drawing, the construction, manner of operation and several advantages of the invention will be clearly and fully understood. When it is desired to project the curved retaining rods 20 from the chambers 17 in the bars 7, the operator presses with his foot upon the end of the rod 42, thus forcing the pivotally connected ends of the links 39 forwardly and permitting the upper portion of the lever 34 to move in a forward direction. The lever being thus released, the springs 31 will expand, and by their forward pressure against the beam 19 will move the rods 16 forwardly through the respective bars 7. These rods being connected at their forward ends to the curved rods 20, the latter will, therefore, be projected upwardly above the surface of the bar. Thus, the hay which has been placed upon the bars 7 by the sweeping rake, will not be withdrawn therefrom but will be retained on the bars 7 by the rods 20. The rods 20 are, of course, retracted to their inoperative positions by reverse movement of the lever 34. When this lever is moved to the full-line position shown in Fig. 4, the links 39 are straightened and the joint connection between said links broken by the sudden throw of the lever so that the joint passes dead center and the links assume the position shown in full lines in Fig. 4.

The tooth bars 7 and 24 are moved to their operative or inoperative positions through the medium of the lever 45, a forward movement of this lever disposing the tooth bars in operative position to receive the hay. In this movement of the lever, the frame 26 is lowered and the rear ends of the bars 7 and 24 forced downwardly through the medium of the rod 48. The forward ends of the tooth bars will thus be elevated so that the hay will be retained thereon. In this manner, it will be seen that I have devised a highly serviceable and effective hay retaining means for sweep rakes, hay stackers, and like means. The invention may be readily applied to the ordinary machine of this character. The construction and arrangement of the several elements employed is also relatively simple, but it is to be understood that I reserve the privilege of adopting all such legitimate changes therein as may be fairly embodied within the spirit and scope of the invention as claimed.

Having thus fully described my invention, what I desire to claim and secure by Letters Patent is:—

1. A hay rake comprising a plurality of spaced tooth bars each having a chamber in its forward end and openings communicating with said chamber through the top and bottom faces of the bar, a retaining rod longitudinally movable in each of said chambers, relatively stationary means in each chamber for directing the rod therein upwardly above the top surface of the bar, and means operatively connected to said rods to operate the same in unison.

2. A hay rake comprising a plurality of spaced tooth bars, a rod longitudinally shiftable in each of said bars, each bar being provided with a chamber in its forward end and an opening in the top of the bar communicating with said chamber, spaced rollers mounted in the chamber, a curved retaining rod movable between said rollers and connected to the end of the shiftable rod, and means for actuating the rods in said bars to project the retaining rods above the upper surfaces of the bars.

3. A hay rake comprising a plurality of spaced rake bars, a rod longitudinally shiftable in each of said bars, each bar having a chamber in its forward end and an opening in the top of the bar at the forward end of the chamber, a second opening in the bottom of said bar at the rear end of said chamber, a curved retaining rod connected at one end to the shiftable rod, guide means for the retaining rod in said chamber, and means for actuating the shiftable rods to simultaneously project the retaining rods above the upper surfaces of the tooth bars.

In testimony whereof I hereunto affix my signature in the presence of two witnesses.

WILBUR L. CLEVELAND.

Witnesses:
L. WIRT MARKHAM,
NELLIE RYBURN.